United States Patent
Tonin et al.

(10) Patent No.: US 9,728,357 B2
(45) Date of Patent: Aug. 8, 2017

(54) SAFETY DEVICE FOR A POWER TRANSFORMER, AND RELATED POWER TRANSFORMER USING SUCH A SAFETY DEVICE

(71) Applicant: ABB TECHNOLOGY AG, Zurich (CH)

(72) Inventors: Andrea Tonin, Brogliano (IT); Carlo Carollo, Thiene (IT); Giuseppe Leonardo Manco, Scalea (IT)

(73) Assignee: ABB Schweiz AG, Baden (CH)

( * ) Notice: Subject to any disclaimer, the term of this patent is extended or adjusted under 35 U.S.C. 154(b) by 394 days.

(21) Appl. No.: 14/596,697

(22) Filed: Jan. 14, 2015

(65) Prior Publication Data
US 2015/0131186 A1    May 14, 2015

Related U.S. Application Data

(63) Continuation of application No. PCT/EP2013/063241, filed on Jun. 25, 2013.

(30) Foreign Application Priority Data

Jul. 20, 2012    (EP) .................................. 12177221

(51) Int. Cl.
*H02H 5/08* (2006.01)
*H01H 33/55* (2006.01)
(Continued)

(52) U.S. Cl.
CPC .......... *H01H 33/555* (2013.01); *H01H 35/40* (2013.01); *H01H 36/02* (2013.01); *H02H 5/08* (2013.01); *H01F 2027/404* (2013.01)

(58) Field of Classification Search
CPC ...... H01H 33/555; H01H 35/40; H01H 36/02; H02H 5/08; H01F 2027/404
See application file for complete search history.

(56) References Cited

U.S. PATENT DOCUMENTS 4,591,816 A * 5/1986 Mikulecky ........... H01H 33/555
335/164
5,900,538 A * 5/1999 Bastian ................ H01H 33/555
340/605
(Continued)

FOREIGN PATENT DOCUMENTS

EP    0 945 951 A2    9/1999
FR    2 936 901 A1    4/2010
(Continued)

OTHER PUBLICATIONS

International Search Report (PCT/ISA/210) mailed on Sep. 30, 2013, by the European Patent Office as the International Searching Authority for International Application No. PCT/EP2013/063241.
(Continued)

*Primary Examiner* — Scott Bauer
(74) *Attorney, Agent, or Firm* — Taft Stettinius & Hollister LLP (57) ABSTRACT

A safety device is disclosed for a power transformer containing a cooling liquid, and can include a shaped body having an inner chamber which is suitable to be at least partially immersed in cooling liquid and inside which gas can accumulate; a first floating element and a second floating element suitable to be at least partially immersed in and moved by cooling liquid; and a switch suitable to be actuated by the first floating element when the gas accumulated is such that the level of the cooling liquid in the inner chamber reaches a predetermined first threshold level and by the second floating element when the gas accumulated is such that the level of the cooling liquid in the inner chamber reaches a lower predetermined second threshold level, respectively. The first and second floating elements can be mounted on and move linearly relative to one or more corresponding guiding supports.

20 Claims, 7 Drawing Sheets

(51) Int. Cl.
*H01H 35/40* (2006.01)
*H01H 36/02* (2006.01)
*H01F 27/40* (2006.01)

(56) References Cited

U.S. PATENT DOCUMENTS

| | | | |
|---|---|---|---|
| 7,343,800 B2* | 3/2008 | Harman | G01F 23/68 |
| | | | 73/313 |
| 2014/0133054 A1* | 5/2014 | Carollo | H01F 27/402 |
| | | | 361/36 |

FOREIGN PATENT DOCUMENTS

| | | |
|---|---|---|
| GB | 1000727 A | 8/1965 |
| NL | 86 718 C | 11/1957 |

OTHER PUBLICATIONS

Written Opinion (PCT/ISA/237) mailed on Sep. 30, 2013, by the European Patent Office as the International Searching Authority for International Application No. PCT/EP2013/063241.
Search Report mailed on Jan. 30, 2013, by the European Patent Office for Application No. 12177221.4.

* cited by examiner

SAFETY DEVICE FOR A POWER TRANSFORMER, AND RELATED POWER TRANSFORMER USING SUCH A SAFETY DEVICE

RELATED APPLICATIONS

This application claims priority as a continuation application under 35 U.S.C. §120 to PCT/EP2013/063241, which was filed as an International Application on Jun. 25, 2013 designating the U.S., and which claims priority to European Application 12177221.4 filed in Europe on Jul. 20, 2012. The entire contents of these applications are hereby incorporated by reference in their entireties.

FIELD

The present disclosure relates to a safety device for an associated liquid-filled power transformer, and to a power transformer comprising such a safety device.

BACKGROUND INFORMATION

It is widely known in the art to use electrical induction devices (e.g. power transformers), which exploit the electromagnetic induction for properly transmitting and distributing electricity over power lines.

Known power transformers include live parts, such as a magnetic core and a certain number of windings, for instance low-voltage windings, high-voltage windings, et cetera.

Due to the intrinsic structural characteristics and functioning of these devices, important aspects of power transformers concern the electric insulation among the various components and cooling thereof which will be guaranteed to provide the desired electromagnetic performance without incurring any malfunctioning or damage.

To this end, a power transformer can include a closed main tank which is filled with an insulating fluid and which houses the live parts; the insulating fluid can be a liquid, for example a highly-refined mineral oil that is stable at high temperatures and has excellent electrical insulating properties; combustion-resistant vegetable oil-based dielectric coolants are also becoming increasingly common as alternatives to mineral oils.

In addition, power transformers can be provided with expansion vessels indicated as oil conservators; such conservators are positioned above the main tank, and have the function of compensating the unavoidable volume changes of the cooling fluid used in the tank, which volume changes result mainly from temperature fluctuations.

Since the insulating liquid helps cooling of the transformer and also contributes to the electrical insulation between live parts inside the tank, it should remain stable at high temperatures for an extended period.

During the working life of a power transformer, it is possible that gas is generated or present inside the tank and this is a clear indication of a possible problem.

For example, the gas may be the result of decomposition/degradation of the solid or liquid insulation inside the transformer caused by overheating or by the strike of electric arcs, or the gas may come from the insulating oil itself due to unsatisfactory de-gassing prior to filling the tank.

In addition, rapid movements, also indicated as rapid currents or flows, of the transformer liquid can be caused by an internal arc, short circuit, or hot spot; these rapid movements are indicative of possible abnormal or dangerous conditions and must be properly addressed.

In order to cope with these issues, there are used suitable safety devices, commonly indicated in the art as Buchholz relays, so that the generation of gas and the presence of rapid movements are detected and related risks are prevented or mitigated as much as possible.

An exemplary Buchholz relay has a chamber inside which the gas formed or present in the transformer is accumulated, as defined by rules and standards, for instance EN 50216.

With the aim of monitoring the quantity of gas formed, Buchholz relays are equipped with two floats which are hinged onto a supporting frame, are immersed into the liquid of the transformer, and are operatively associated to corresponding switches.

In detail one float, which is positioned inside the chamber at an upper part, starts to rotate at the onset of gas formation and activates some electrical contacts so as to cause an alarm signal if the quantity of gas is such that the level of liquid inside the chamber reaches a first alarm threshold. The second float starts to rotate after the alarm signal is generated and activates some corresponding electrical contacts to trip the transformer and disconnect it from power feeding when the quantity of gas is such that the level of liquid inside the chamber reaches a second trip threshold.

Although these known safety devices acceptably perform their functions, there are some aspects that can be optimized, such as with regard to the constructive layout of and the space available inside the safety device itself. Indeed, there are more and more requirements to add new functionalities to the existing safety devices, such as for example to be able to continuously measure the gas formation and to properly monitor the transformer functioning over time and even remotely. With the actual constructive layout, the space inside a traditional Buchholz relay may not be optimal and the actual floating equipment can be quite cumbersome.

SUMMARY

A safety device is disclosed which is suitable to be associated with a power transformer containing a cooling liquid, the safety device comprising: a shaped body having an inner chamber configured to be at least partially immersed in cooling liquid and inside which gas can accumulate; a first floating element and a second floating element configured to be at least partially immersed in and moved by cooling liquid; switching means for actuation by said first floating element when the gas accumulated is such that a level of cooling liquid in the inner chamber reaches a predetermined first threshold level, and by said second floating element when the gas accumulated is such that the level of said cooling liquid in the inner chamber reaches a lower predetermined second threshold level, respectively; and wherein said first floating element and said second floating element are mounted on and are configured to move linearly along a reference axis relative to one or more corresponding guiding supports.

BRIEF DESCRIPTION OF THE DRAWINGS

Detailed characteristics and advantages will become apparent from the description of some exemplary, but not exclusive embodiments, of a safety device and method according to the present disclosure, illustrated by way of non-limited examples with the accompanying drawings, wherein.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

DETAILED DESCRIPTION

The present disclosure provides a safety device suitable to be associated to a power transformer containing a cooling liquid, and can include:

- a shaped body having an inner chamber which is suitable to be at least partially immersed in the cooling liquid and inside which gas can accumulate;
- a first floating element and a second floating element suitable to be at least partially immersed in and moved by the cooling liquid; and
- switching means suitable to be actuated by the first floating element when the gas accumulated is such that the level of the cooling liquid in the inner chamber reaches a predetermined first threshold level, and by the second floating element when the gas accumulated is such that the level of the cooling liquid in the inner chamber reaches a lower predetermined second threshold level, respectively; wherein the first floating element and the second floating element are mounted on and move linearly relative to one or more corresponding guiding supports.

Figure 1:
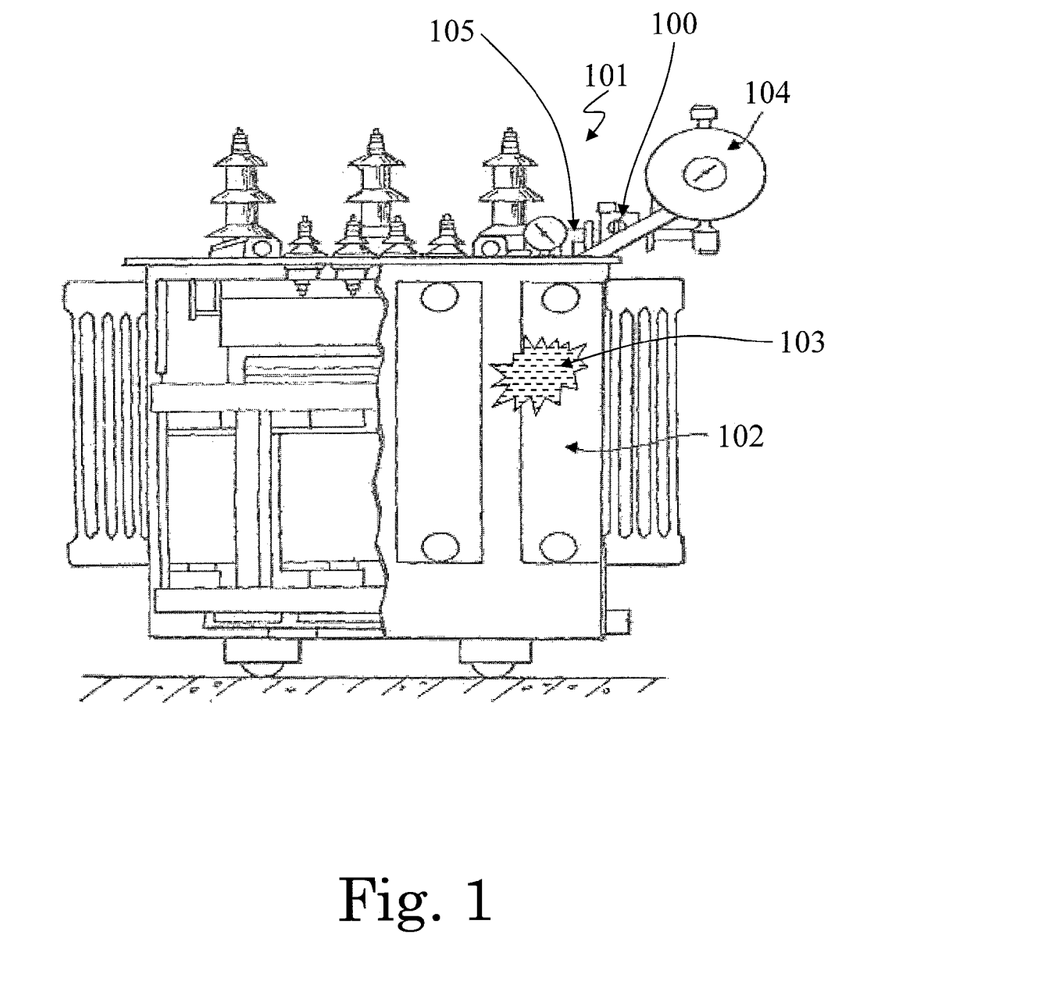
FIG. 1 is a view illustrating an exemplary power transformer equipped with a safety device according to the present disclosure.

FIG. 1 shows an exemplary power transformer 101 having a tank 102 filled with a cooling/insulating liquid 103 (hereinafter referred to as cooling liquid 103 for the sake of conciseness) of a type known per se (e.g., a mineral or vegetal oil); an expansion vessel or conservator 104, also filled with the cooling liquid 103, is mechanically connected to the tank 102 and is positioned as shown on top of the tank 102 itself.

A suitable pipe system 105 is provided for fluid communication between the conservator 104 and the tank 102.

As illustrated in the exemplary embodiment of FIG. 1, the transformer 101 is equipped with at least one safety device 100 according to the present disclosure, which is for instance fitted in the pipe system 105 along the fluid path leading from the tank 102 to the conservator 104.

Figure 2:
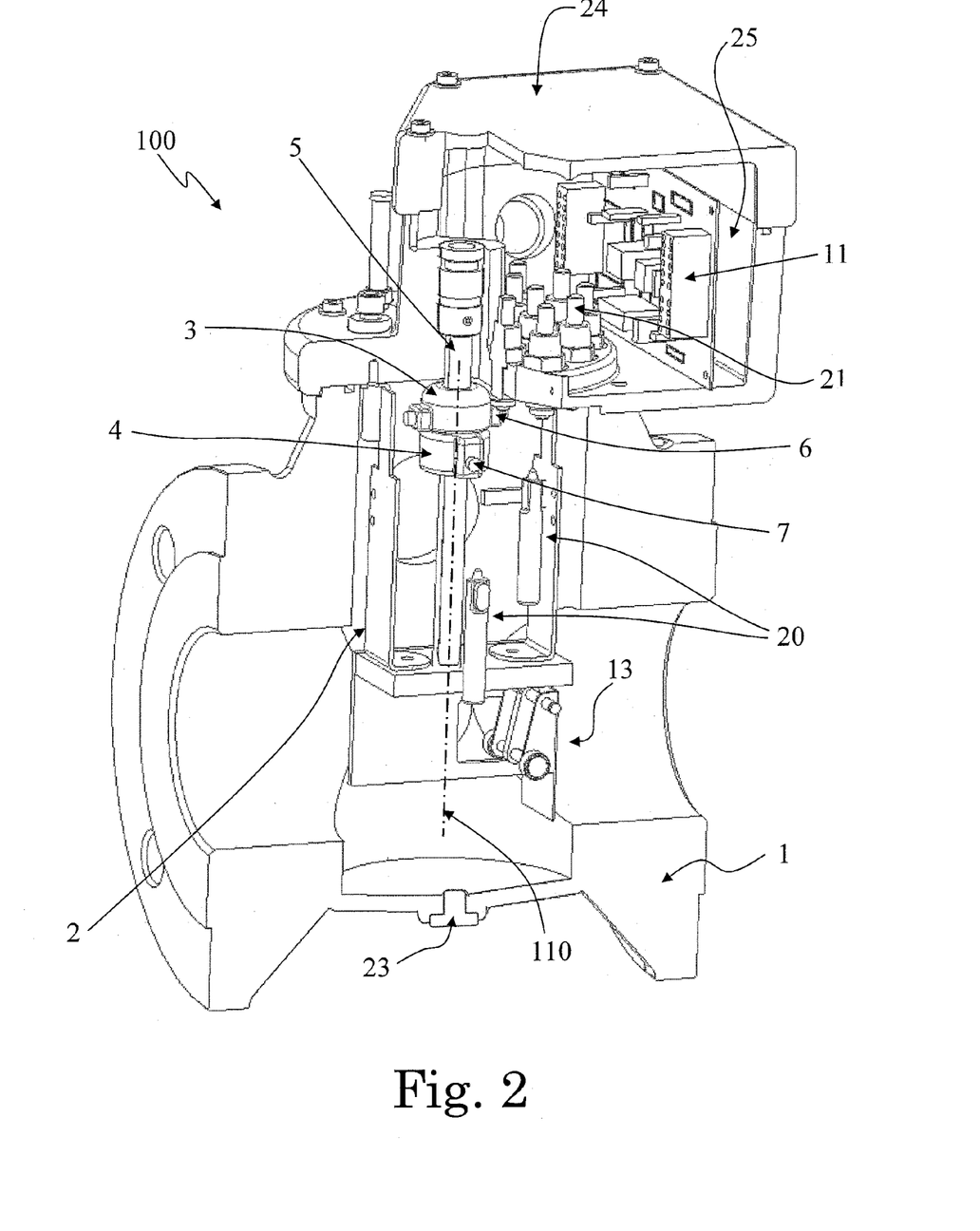
FIG. 2 is a perspective view, partially cut, showing an exemplary embodiment of a safety device according to the present disclosure in a first position.
Figure 3:
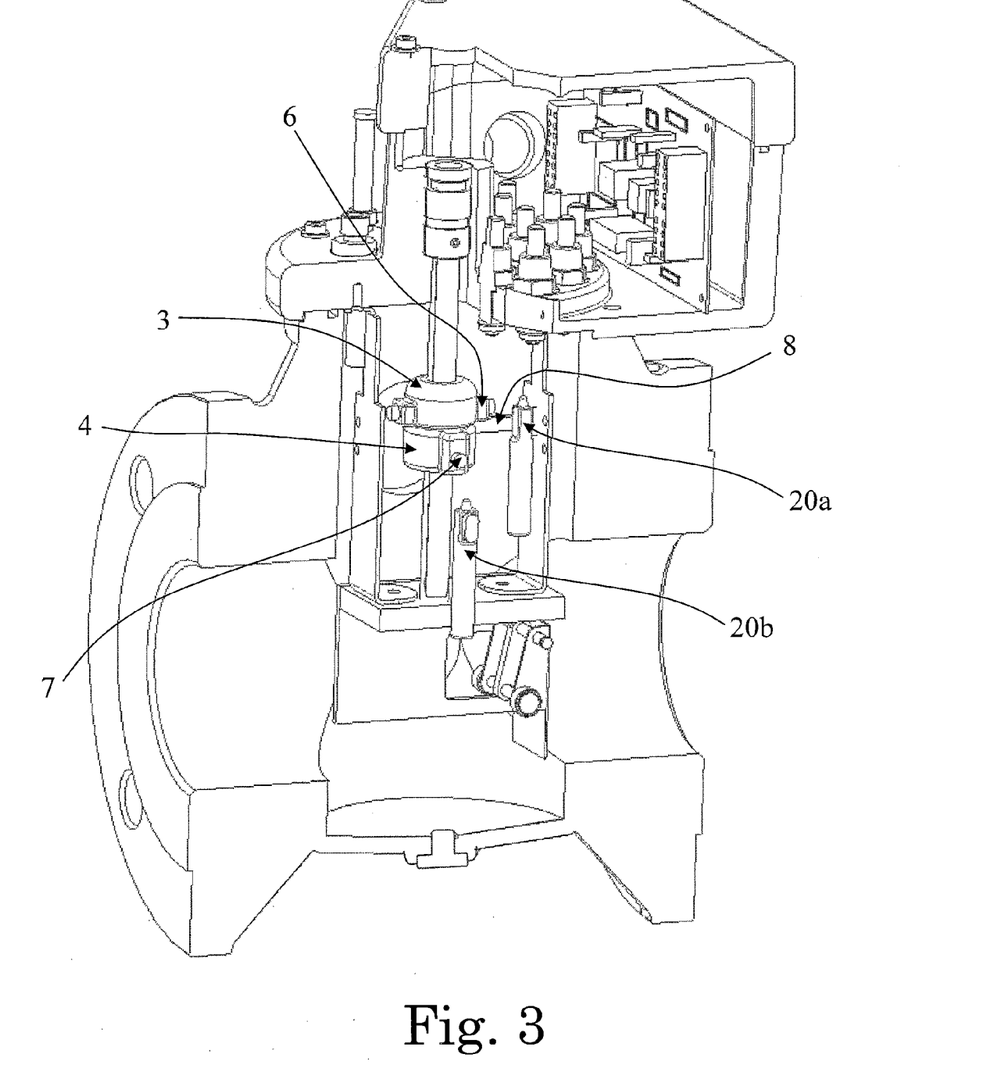
FIG. 3 is a perspective view, partially cut, showing the safety device of FIG. 2 in a second alarm position.
Figure 4:
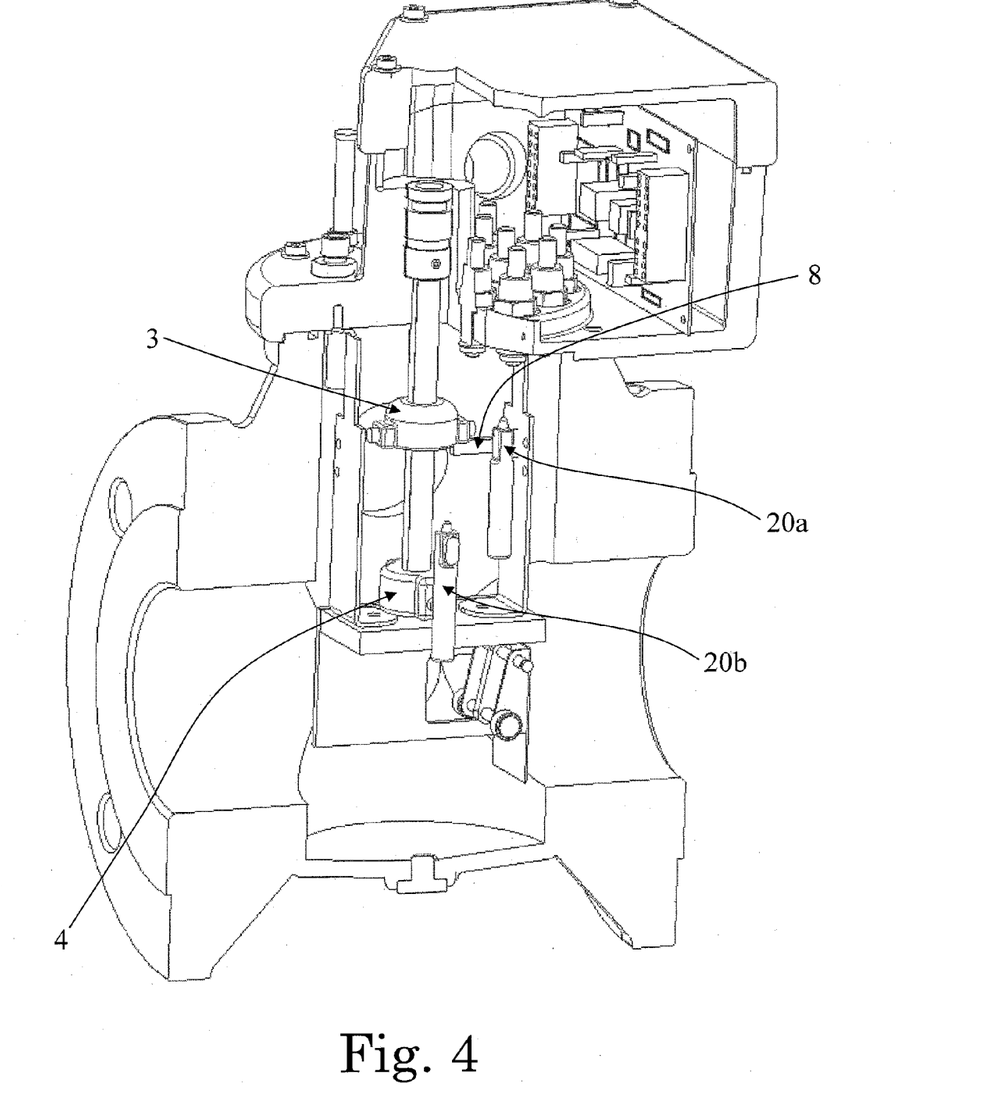
FIG. 4 is a perspective view, partially cut, showing the safety device of FIG. 2 in a third trip position.

In the exemplary embodiment illustrated in FIGS. 2-4, the safety device 100 includes a shaped body 1 which is made for instance of cast aluminum alloy and is for example shaped to be connected to the pipe system 105; the shaped body 1 has an inner chamber 2 which, when the device 100 is connected in operation with the associated transformer 101, is suitable to be immersed at least partially in the cooling liquid 103 and inside which gas present or generated in the transformer 101 can accumulate.

An oil drain plug 23 can be provided at the bottom part of the inner chamber 2; further, the body 1 is for example provided with a cover 24 shaped so as to form with the upper part of the body 1 a further inner space 25.

The safety device 100 can include a first floating element 3 and a second floating element 4 which are suitable to be at least partially immersed in and moved by movements of the cooling liquid 103 when the device 100 is connected to the transformer 101; and switching means 20 which are suitable to be actuated by the first floating element 3 when the gas accumulated in the inner chamber 2 is such that the level of the cooling liquid 103 in the inner chamber 2 reaches a predetermined first alarm threshold level and by the second floating element 4 when the gas accumulated in the inner chamber 2 is such that the level of the cooling liquid 103 in the inner chamber 2 reaches a lower predetermined second threshold level, respectively.

In the exemplary embodiments illustrated, the two floating elements 3 and 4 are positioned inside the inner chamber 2.

For example, in the safety device 100 according to an exemplary embodiment of the present disclosure, the first floating element 3 and the second floating element 4 are mounted on one or more corresponding guiding supports 5 and move linearly along a reference axis relative thereto, namely both floating elements 3 and 4 slide along a substantially rectilinear direction on and relative to the one or more corresponding guiding supports 5.

For example, as illustrated in the embodiments of FIGS. 2-4, the first floating element 3 and the second floating element 4 are mounted both on and move linearly relative to a common guide support 5; for instance, the common guide support 5 can include a shaft 5 which is positioned inside the inner chamber 2 with the two floating elements 3 and 4 mounted thereon and sliding along the reference axis 110 (e.g., the axis of the shaft 5 itself.)

In the exemplary embodiments illustrated, the switching means 20 can include for instance two switches, namely a first magnetic switch 20a or alarm switch 20a, and a second magnetic switch 20b or trip switch 20b, which can be placed in corresponding seats provided on the shaped body 1.

Such switches 20a, 20b are of type known per se and for instance can include, inside a bulb, a magnet and electrical contacts, which are operatively connected to an alarm circuit for the switch 20a, and to a power disconnection circuit for the trip switch 20b, respectively, according to solutions known in the art or readily available to those skilled in the art and therefore not described herein in detail.

As illustrated, at least one first magnet 6 is placed on and moves substantially solidly with the first floating element 3 so as to activate the first magnetic switch 20a when the first floating element 3 reaches a position corresponding to the predetermined first threshold level; likewise, at least one second magnet 7 is placed on and moves solidly with the second floating element 4 so as to activate the second magnetic switch 20b when the second floating element 4 reaches a position corresponding to the predetermined second threshold level.

Further, the safety device 100 can include a stopper 8 (e.g., a mechanical stopper), suitable to interact with and stop the first floating element 3 when the first floating element 3 itself reaches a position corresponding to the predetermined first threshold level, as illustrated in FIG. 3.

For example, as illustrated in the attached figures, the first floating element 3 and the second floating element 4 can be mounted on the common guide support 5 so as to move, for instance in contact to each other, until the first floating element 3 reaches the position corresponding to the predetermined first threshold level and is blocked there by the stopper 8, while the second floating element 4 can continue to slide down if the level of cooling liquid 103 in the inner chamber 2 continues to further lower.

Figure 5:
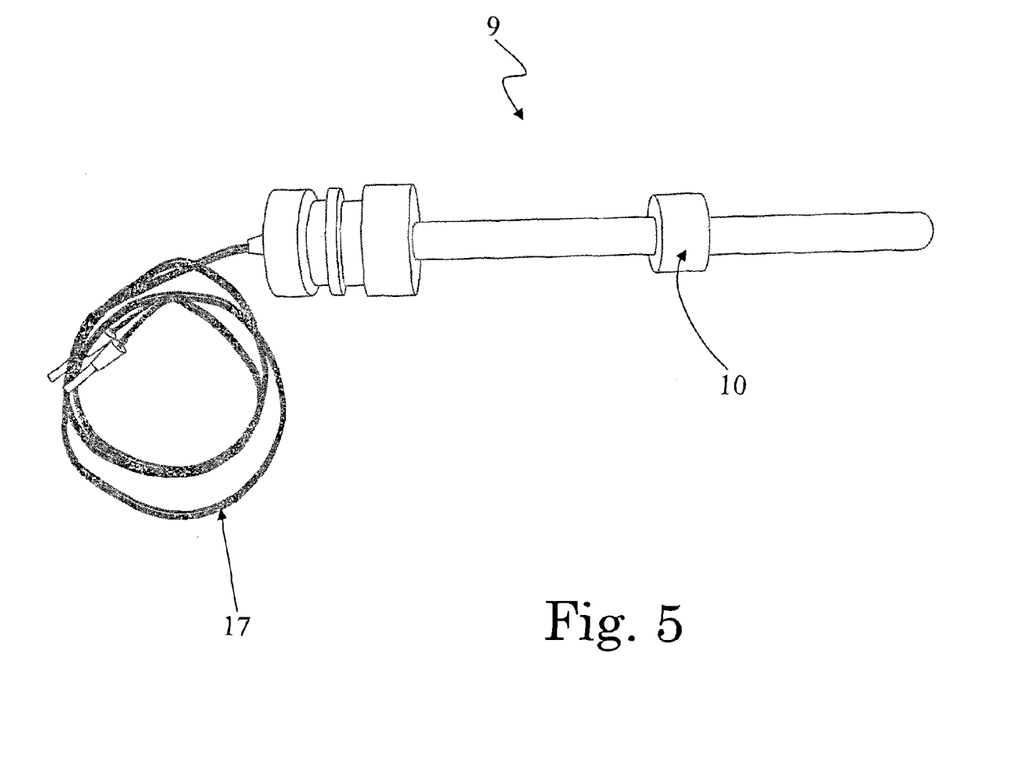
FIG. 5 is a perspective view showing an exemplary transducer used in the safety device according to the present disclosure.
Figure 6:
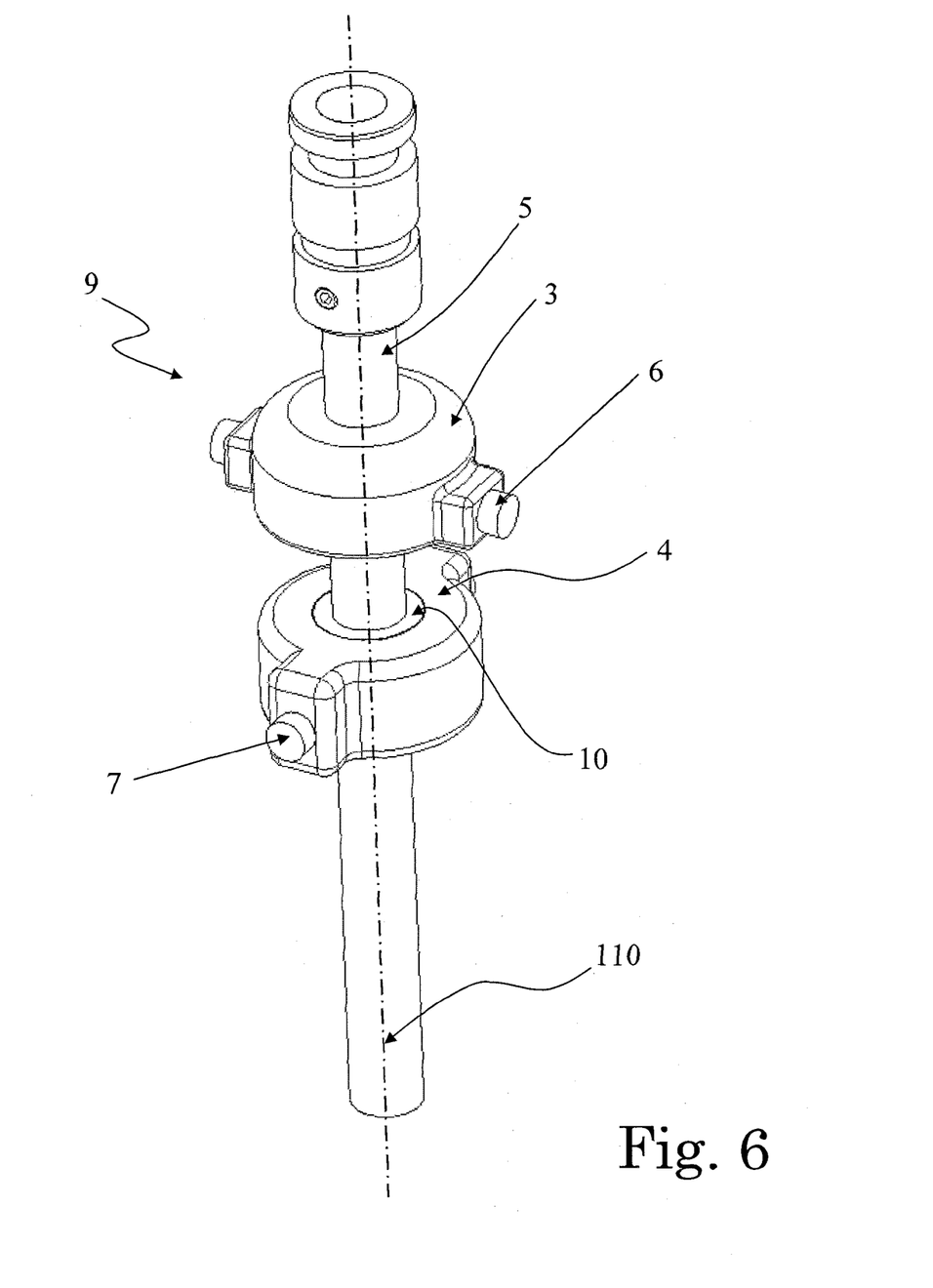
FIG. 6 is a perspective view illustrating exemplary components of the safety device according to the present disclosure.

The safety device 100 can include a transducer 9 having a cursor 10 suitable to be at least partially immersed in and moved by movements of the cooling liquid 103; the transducer 9, illustrated for example in FIG. 5, can be also positioned inside the inner chamber 2, and can be arranged to output signals indicative of the actual position of the cursor 10 to an operatively associated electronic unit 11. For example, the transducer 9 can include output cables 17 which are connected to terminals 21 placed inside the inner space 25; also the electronic unit 11 is connected (connections not illustrated for simplicity of illustration) to the terminals 21 and is positioned inside the space 25.

For example, the transducer 9 can include a potentiometer (e.g., a linear position transducer type IC marketed by Gefran).

For example, when the cursor 10 is moved by movements (e.g., changes of levels), of the cooling liquid 103, the transducer 9 outputs signals (e.g., electric signals), indicative of the actual position assumed by the cursor 10 as a consequence of movements of the cooling liquid 103, which signals are therefore indicative of the actual level of cooling liquid 103 and therefore ultimately of the quantity of gas accumulated.

The electronic unit 11 can be arranged so as to produce, based on the output signals produced by the transducer 9, data related to actual conditions of the transformer 101 and/or of its cooling liquid 103, and if desired to transmit also remotely the data produce.

For example, the electronic unit 11 can be arranged so as to produce at least data indicative of the actual quantity of gas accumulated by the safety device 100 coming from tank 102 to conservator 104 through pipe 105, which gas accumulated is indicative of the quantity of gas generated into the transformer 101 for whatever reason.

Further, the electronic unit 11 can be part of the alarm circuit connected to the first magnetic switch 20a and also of the power disconnection circuit connected to the second switch 20b.

For example, when the quantity of gas generated in the transformer 101 exceeds the predetermined first threshold (e.g., the first floating element 3 has reached the position corresponding to the first threshold level and has caused the actuation of the first magnetic switch 20a), the electronic unit 11 can receive, directly or indirectly, an input signal from the first switch 20a and outputs an alarm signal. Such an alarm signal can be of any type (e.g., acoustic or visual), and direct or indirect (e.g., it can cause switching of a lamp device or a siren, or can be routed to a switch which in turn actuates a lamp or a siren), and can be transmitted locally and/or remotely in whatever manner possible, (e.g., through wires or wireless).

Likewise, when the quantity of gas generated in the transformer 101 exceeds the predetermined second threshold (e.g., the second floating element 4 has reached the position corresponding to the second threshold level and has caused the actuation of the second magnetic switch 20b), the electronic unit 11 can receive, directly or indirectly, an input signal from the second switch 20b and outputs a trip signal; this trip signal can be routed, locally and/or remotely, to an associated switch or trip unit whose intervention disconnects electric power feeding the power transformer 101.

As those skilled in the art may appreciate, the electronic unit 11 can include any suitable and commercially available micro-processor based electronic unit which elaborates digital data and outputs corresponding digital signals (e.g., a micro-processor NXP type LPC210).

According to an exemplary embodiment illustrated in FIGS. 2-4 and 6, the second floating element 3 is mounted on and solidly moves with the cursor 10 or said in another way, the cursor 10 is fitted inside the second floating 4 and slides together with along the same direction (e.g., the same reference axis 110).

For example, as illustrated in such figures, the transducer 9 can include a shaped body (e.g., rod- or stick-shaped), forming the common guide support 5 on which the two floating elements 3 and 4 are mounted and slide relative to the body itself.

Figure 7:
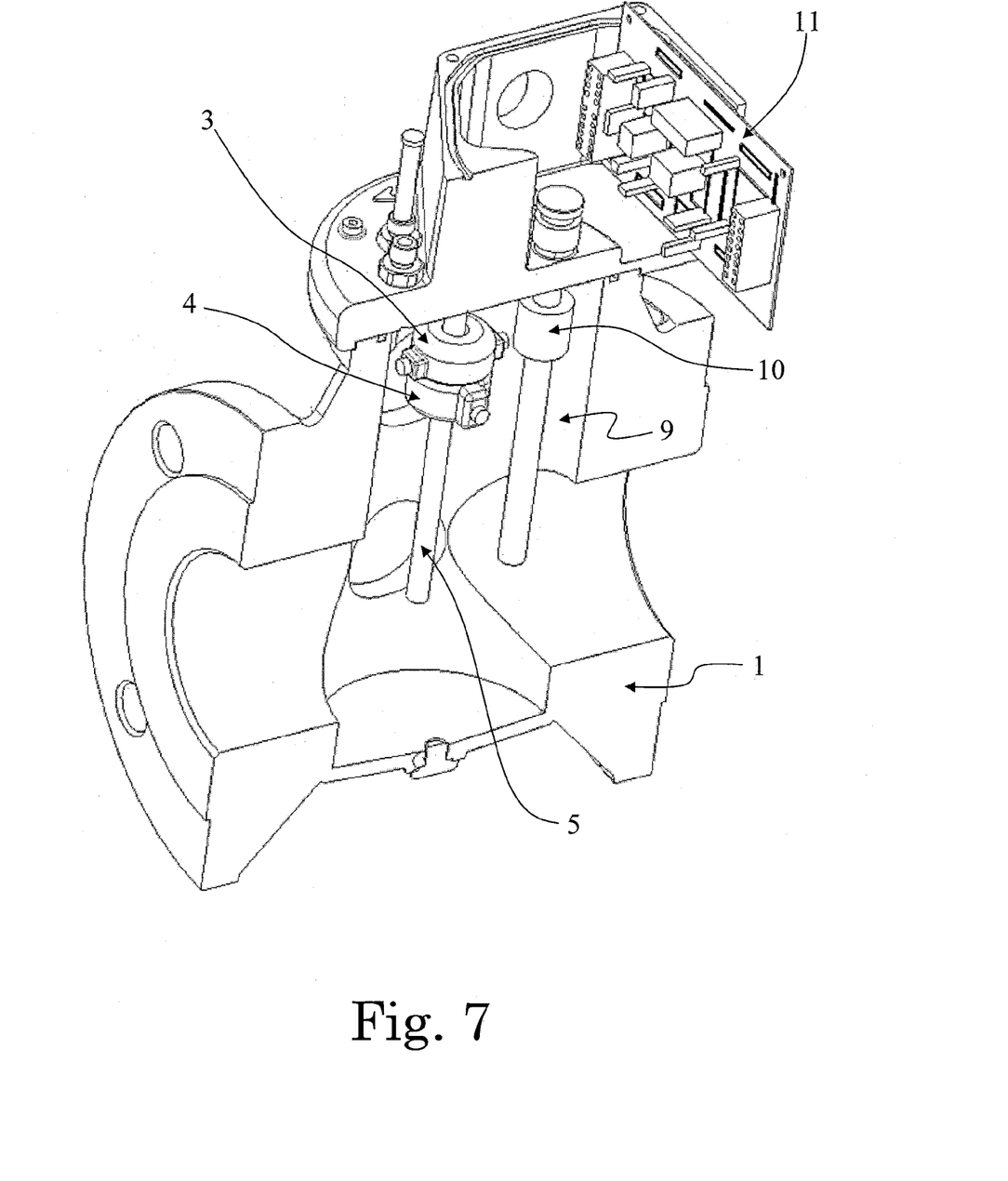
FIG. 7 is a perspective view, partially cut, schematically showing a further exemplary embodiment of a safety device according to the present disclosure.

Alternatively, as for example schematically illustrated in FIG. 7, the transducer 9 can be fitted in the shaped body 1 of the device 100, as a separate component with respect to the guiding support 5 and related floating elements 3, 4. In FIG. 7, for the sake of clarity of illustration, some components of the device 100 (e.g., the flap 13, the switch means 20, the stopper 8, terminals 21, etc cetera) have been removed.

The safety device 100 can include a further movable element or flap 13 suitable to be at least partially immersed in and moved by the cooling liquid 103; this movable element 13 can be arranged to detect if the actual flow rate of the cooling liquid exceeds a predetermined third threshold and to actuate an associated switch suitable to disconnect electric power feeding said power transformer. For example, the flap 13 can be connected (e.g., hinged along the common guide support 5), for instance at an end portion thereof, or can be mounted on another supporting part, and the associated switch can be one of the first or second switches 20a, 20b, or an additional switch.

In this case, for example, the electronic unit 11 can be also arranged to produce data indicative of the actual flow rate of the cooling liquid 103 (e.g., the speed of movement of such liquid) and to output a trip signal if the produced data indicative of the flow-rate of the cooling liquid 103 exceeds the related predetermined third threshold. Also this trip signal can be routed, locally and/or remotely, in whatever manner (e.g., through cabling or wireless), to any associated switch or trip unit whose intervention disconnects the electric power feeding the power transformer 101.

In practice, once the safety device 100 is connected to the associated power transformer 101, if during the normal functioning of the transformer gas forms or becomes present inside the transformer 101 for whatever reason, such gas tends to escape upward and to accumulate inside the body 1, and for example inside the upper part of the inner chamber 2. As a consequence, the gas present lowers the level of the cooling liquid 103 and thus causes the movement of the floating elements 3 and 4 downwards, and also the movement of the cursor 10. Hence, the transducer 9 gives continuously the variation of its resistance values which are detected by the associated electronic unit 11 and are indicative of the actual position reached and therefore of the level reached by the liquid as a consequence of the quantity of gas actually generated in the transformer 101.

In this way, since the actual quantity of gas can be continuously derived from the actual level reached by the cooling liquid 103, it is possible to track and have almost complete information about how much gas is present and the trend thereof over the time.

If the quantity of gas present in the transformer 101 is such that the level of the liquid is at and hence the first floating element 3 has reached the position corresponding to the predetermined first threshold, the magnet 6 activates the associated first magnetic switch 20a which causes the generation of an alarm signal; if the quantity of gas generated in the transformer 101 continues to increase, while the first floating 3 is stopped by the stop 8, the second floating 4 together with the cursor 10 slides further down until the level of liquid 103 and hence the second floating element 4 has reached the position corresponding to that of the predetermined second threshold; in this position the magnet 7 activates the second switch 20b which causes the generation of a trip signal and hence disconnects the electric power feeding the transformer 101.

In operation, it is also possible that for some reasons (e.g., a violent and sudden short circuit), strong/rapid currents of the liquid 103 are generated inside the tank 102; such rapid movements of the liquid are due for example to dangerous or abnormal working conditions and hence, in order to limit the negative effects, a related flow rate limit (hereinafter referred to as "third threshold") is defined. The flow rate and therefore rapid currents or movements of the cooling liquid can cause the rotation of the flap 13; if the flow rate of the cooling liquid exceeds the predefined third threshold then the movement of the element 13 is such that to actuate the associated switch which produces, directly or indirectly, the trip signal meant to cause disconnection of electric power feeding the transformer 101.

In practice, it has been found that the safety device 100 according to exemplary embodiments of the present disclosure offers a solution which can be quite simple and has a constructive layout which is substantially different from known Buchholz relays and allows to reduce the space occupied by the floating components and related supporting structure.

The optimization of the space available allows use of other components which can increase the functionalities and performance of the device as previously described, and without modifying substantially or increasing the size of its structure.

Due to these characteristics, the safety device 100 according to exemplary embodiments of the present disclosure can be suitable to monitor in principle any type of power transformer filled with a cooling/insulating liquid.

Hence, the present disclosure also encompasses a power transformer 101 including at least one safety device 100 of the type previously described and as defined in the appended claims. More than one safety device 100 can of course be used in a single power transformer.

The device as disclosed is susceptible of modifications and variations, all of which are within the scope of the inventive concept as defined in particular by the appended claims; any possible combination of the previously disclosed embodiments can be implemented and should be considered within the inventive concept of the present disclosure; all the details may furthermore be replaced with technically equivalent elements.

Also the materials used, so long as they are compatible with the specific use and purpose, as well as the dimensions, may be any according to the specifications and/or requirements and the state of the art; for example the various floating or movable elements are for example made totally or partially of plastic materials but any suitable different material may be used.

Therefore, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A safety device suitable to be associated with a power transformer containing a cooling liquid, the safety device comprising:
    a shaped body having an inner chamber configured to be at least partially immersed in cooling liquid and inside which gas can accumulate;
    a first floating element and a second floating element configured to be at least partially immersed in and moved by cooling liquid;
    switching means for actuation by said first floating element when the gas accumulated is such that a level of cooling liquid in the inner chamber reaches a predetermined first threshold level, and by said second floating element when the gas accumulated is such that the level of said cooling liquid in the inner chamber reaches a lower predetermined second threshold level, respectively; and
    wherein said first floating element and said second floating element are mounted on and are configured to move linearly along a reference axis relative to one or more corresponding guiding supports.

2. The safety device according to claim 1, wherein said first floating element and said second floating element are mounted both on and configured to move linearly relative to a common guide support.

3. The safety device according to claim 1, wherein said switching means comprise:
    a first magnetic switch, wherein at least one first magnet is placed on and is configured to move solidly with said first floating element so as to activate said first magnetic switch when the first floating element reaches a position corresponding to said predetermined first threshold level.

4. The safety device according to claim 3, wherein said switching means comprise:
    a second magnetic switch, wherein at least one second magnet is placed on and is configured to move solidly with said second floating element so as to activate said second magnetic switch when the second floating element reaches a position corresponding to said predetermined second threshold level.

5. The safety device according to claim 1, comprising:
    a stopper suitable to interact with and stop said first floating element when the first floating element reaches a position corresponding to said predetermined first threshold level.

6. The safety device according to claim 1, comprising:
    a transducer having a cursor configured to be at least partially immersed in and moved by movements of said cooling liquid, said transducer being arranged to output signals indicative of an actual position of the cursor to an associated electronic unit.

7. The safety device according to claim 6, wherein said second floating element is mounted on and configured to solidly move with said cursor.

8. The safety device according to claim 6, wherein said transducer comprises:
a shaped body forming a common guide support as the guiding supports.

9. The safety device according to claim 6, wherein said transducer comprises:
a potentiometer.

10. The safety device according to claim 1, comprises:
a further movable element configured to be at least partially immersed in and moved by said cooling liquid, said further movable element being arranged to detect if an actual flow rate of said cooling liquid exceeds a predetermined third threshold and to actuate an associated switch suitable to disconnect an electric power connection to be used for feeding a power transformer.

11. A power transformer comprising:
a tank at least partially filled with a cooling liquid; and
at least one safety device according to claim 1 configured for operation by the cooling liquid.

12. The safety device according to claim 2, wherein said switching means comprise:
a first magnetic switch, wherein at least one first magnet is placed on and is configured to move solidly with said first floating element so as to activate said first magnetic switch when the first floating element reaches a position corresponding to said predetermined first threshold level.

13. The safety device according to claim 12, wherein said switching means comprise:
a second magnetic switch, wherein at least one second magnet is placed on and is configured to move solidly with said second floating element so as to activate said second magnetic switch when the second floating element reaches a position corresponding to said predetermined second threshold level.

14. The safety device according to claim 13, comprising:
a stopper suitable to interact with and stop said first floating element when the first floating element reaches a position corresponding to said predetermined first threshold level.

15. The safety device according to claim 14, comprising:
a transducer having a cursor configured to be at least partially immersed in and moved by movements of said cooling liquid, said transducer being arranged to output signals indicative of an actual position of the cursor to the associated electronic unit.

16. The safety device according to claim 15, wherein said second floating element is mounted on and configured to solidly move with said cursor.

17. The safety device according to claim 15, wherein said transducer comprises:
a shaped body forming said common guide support.

18. The safety device according to claim 15, wherein said transducer comprises:
a potentiometer.

19. The safety device according to claim 15, comprises:
a further movable element configured to be at least partially immersed in and moved by said cooling liquid, said further movable element being arranged to detect if an actual flow rate of said cooling liquid exceeds a predetermined third threshold and to actuate an associated switch suitable to disconnect an electric power connection to be used for feeding a power transformer.

20. A power transformer comprising:
a tank at least partially filled with a cooling liquid; and
at least one safety device according to claim 15 configured for operation by the cooling liquid.

* * * * *